(12) United States Patent
Neumeister et al.

(10) Patent No.: US 10,139,171 B2
(45) Date of Patent: Nov. 27, 2018

(54) HEAT EXCHANGER AND TUBE

(71) Applicant: MAHLE INTERNATIONAL GMBH, Stuttgart (DE)

(72) Inventors: Dirk Neumeister, Stuttgart (DE); Georg Feldhaus, Stuttgart (DE)

(73) Assignee: MAHLE INTERNATIONAL GMBH, Stuttgart (DE)

(*) Notice: Subject to any disclaimer, the term of this patent is extended or adjusted under 35 U.S.C. 154(b) by 0 days.

(21) Appl. No.: 15/503,499

(22) PCT Filed: Aug. 11, 2015

(86) PCT No.: PCT/EP2015/068487
§ 371 (c)(1),
(2) Date: Feb. 13, 2017

(87) PCT Pub. No.: WO2016/023912
PCT Pub. Date: Feb. 18, 2016

(65) Prior Publication Data
US 2017/0227301 A1 Aug. 10, 2017

(30) Foreign Application Priority Data
Aug. 11, 2014 (DE) .................. 10 2014 215 908

(51) Int. Cl.
*F28F 1/00* (2006.01)
*F28F 1/12* (2006.01)
(Continued)

(52) U.S. Cl.
CPC ............ *F28F 1/12* (2013.01); *F28D 1/05383* (2013.01); *F28D 7/0066* (2013.01);
(Continued)

(58) Field of Classification Search
CPC .. F28F 1/12; F28F 9/02; F28D 7/0066; F28D 13/00
(Continued)

(56) References Cited

U.S. PATENT DOCUMENTS 4,865,122 A * 9/1989 Brown .................... F28D 13/00
122/4 D
5,400,853 A 3/1995 Wolters
(Continued)

FOREIGN PATENT DOCUMENTS

CN 1842690 A 10/2006
CN 101910774 A 12/2010
(Continued)

OTHER PUBLICATIONS

International Search Report, PCT/EP2015/068487, dated Oct. 23, 2015, 2 pgs.
(Continued)

*Primary Examiner* — Davis Hwu
(74) *Attorney, Agent, or Firm* — Paul D. Strain, Esq.; Strain & Strain PLLC

(57) ABSTRACT

The invention relates to a heat exchanger, particularly for cooling a fluid, comprising a plurality of tubes through which a fluid can flow, an end face of each tube terminating in a collector chamber, said collector chambers being fluidically interconnected by means of the tubes and at least one of said tubes comprising at least one wall section formed from a selectively-permeable membrane. The invention also relates to a tube for a heat exchanger.

16 Claims, 1 Drawing Sheet

(51) Int. Cl.
    *F28D 1/053*       (2006.01)
    *F28D 21/00*       (2006.01)
    *F28F 1/02*        (2006.01)
    *F28D 7/00*        (2006.01)
    *F28F 9/02*        (2006.01)

(52) U.S. Cl.
    CPC .......... *F28D 21/0015* (2013.01); *F28F 1/022* (2013.01); *F28F 9/02* (2013.01); *B01D 2313/38* (2013.01)

(58) Field of Classification Search
    USPC ....................................................... 165/177
    See application file for complete search history.

(56) References Cited

U.S. PATENT DOCUMENTS 8,585,396 B2 * 11/2013 Hockaday ............... F23C 13/00
                                                    431/170

2010/0031817 A1   2/2010   Ehrenberg et al.

FOREIGN PATENT DOCUMENTS

| | | |
|---|---|---|
| DE | 39 39 867 A1 | 6/1991 |
| DE | 199 36 486 C1 | 3/2001 |
| DE | 10 2005 047 840 A1 | 6/2006 |
| DE | 601 29 003 T2 | 2/2008 |
| DE | 10 2008 062 704 A1 | 8/2009 |
| DE | 10 2006 048 187 B4 | 2/2013 |
| WO | WO 2005/075925 A1 | 8/2005 |
| WO | WO 2008/039779 A2 | 4/2008 |
| WO | WO 2012/045717 A1 | 4/2012 |
| WO | WO 2013/038708 A1 | 3/2013 |

OTHER PUBLICATIONS

German Search Report, Appl. No. 10 2014 215 908.3, dated Apr. 16, 2015, 7 pgs.

* cited by examiner

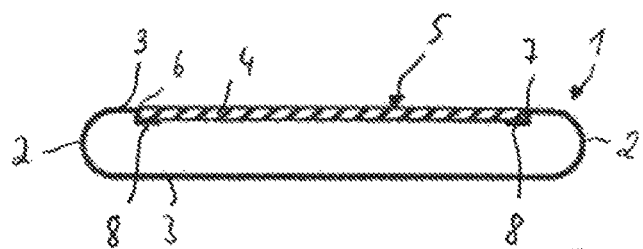
Fig. 1
Fig. 2
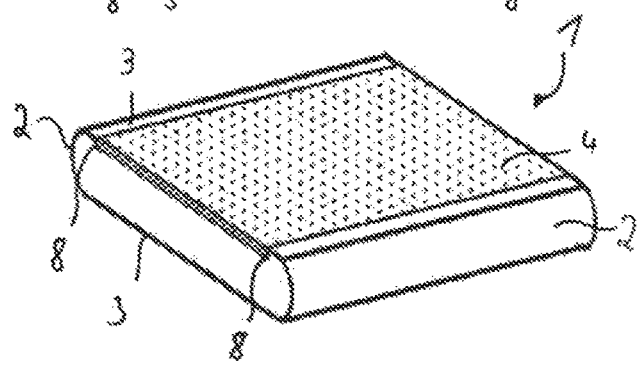
Fig. 3
Fig. 4
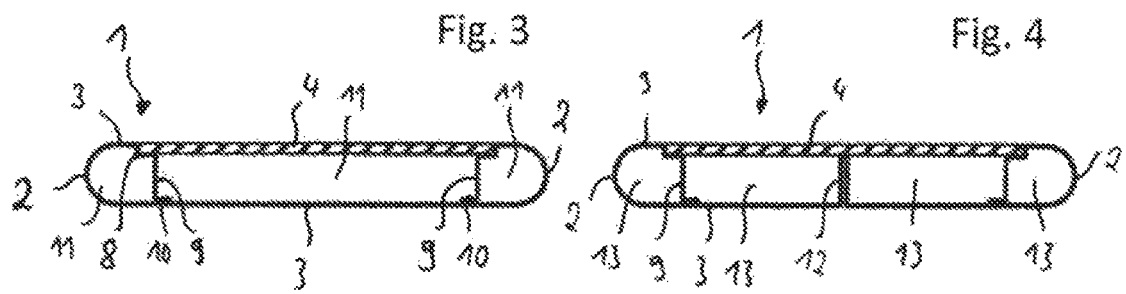
Fig. 5
Fig. 6
Fig. 7

HEAT EXCHANGER AND TUBE

CROSS-REFERENCE TO RELATED PATENT APPLICATIONS

This application is a National Stage of International Application No. PCT/EP2015/068487, filed Aug. 11, 2015, which is based upon and claims the benefit of priority from prior German Patent Application No. 10 2014 215 908.3, filed Aug. 11, 2014, the entire contents of all of which are incorporated herein by reference in their entirety.

TECHNICAL FIELD

The invention relates to a heat exchanger, in particular for cooling a fluid, having a plurality of tubes which can be flowed through by a fluid and open on the end side in each case into a header box, the header boxes being in fluid communication with one another by way of the tubes. Moreover, the invention relates a tube for a heat exchanger.

PRIOR ART

Heat exchangers are used in vehicles, in order to discharge the waste which is produced during operation. Since the required cooling performance continues to increase in modern motor vehicles and, in particular, in vehicles which are driven by electric motors, heat exchangers with higher cooling performance are necessary.

An increased cooling performance requirement also exists, inter alia, in the fuel cell systems which generate large quantities of heat during operation. In order to ensure stable and reliable operation, the heat which is produced has to be discharged.

In order to increase the cooling performance of heat exchangers, apparatuses are known in the prior art which have permeable wall sections, in order to make it possible for a fluid to cross over from the coolant circuit to the outer surface of the heat exchanger. There, the fluid which has crossed over can evaporate, as a result of which the cooling performance of the heat exchanger overall is increased.

DE 10 2006 048 178 B4 discloses an evaporative cooling system for a fuel cell system. A conventional cooler is integrated into the evaporative cooling system, which conventional cooler has a selectively permeable wall section, through which water which is contained in the coolant can pass and can evaporate on the outer surface of the cooler.

DE 39 39 867 A1 discloses a composite diaphragm for separating water from a fluid by means of pervaporation. The diaphragm permits the passage of water, while other constituent parts of the fluid are held back.

It is a disadvantage of the apparatuses in the prior art that the production and the construction of heat exchangers with permeable wall sections are not sufficiently disclosed and, in particular, the problems which result from the temperature sensitivity of the permeable diaphragm are not taken into consideration sufficiently during the production.

SUMMARY OF THE INVENTION, PROBLEM, SOLUTION, ADVANTAGES

It is therefore the problem of the present invention to provide a heat exchanger which is improved in comparison with the prior art and can be produced simply and inexpensively. Moreover, it is the problem of the invention to provide a tube in this regard.

The problem with regard to the heat exchanger is solved by way of a heat exchanger having the features of claim 1.

One exemplary embodiment of the invention relates to a heat exchanger, in particular for cooling a fluid, having a plurality of tubes which can be flowed through by a fluid and open on the end side in each case into a header box, the header boxes being in fluid communication with one another by way of the tubes, at least one of the tubes having at least one wall section which is configured by way of a selectively permeable diaphragm.

As a result, a heat exchanger is provided which, in addition to the cooling performance which results from the exchange of heat at the outer surface to the air, produces a cooling performance which is produced by way of the evaporation of water on the outer surface. The heat exchanger can advantageously be provided with the aid of a production method which does not require any process temperatures above a limit which is critical for the selectively permeable diaphragm.

Here, all tubes can also have at least one, or more preferably precisely one wall section which is configured by way of a selectively permeable diaphragm.

A wall section of a tube which is formed by way of a selectively permeable diaphragm is particularly advantageous, since the tubes are as a rule part of the heat exchanger block which is flowed around by a cooling fluid. This is the case, in particular, in heat exchangers of tube/fin design. As a rule, high temperatures occur at the heat exchanger block, which high temperatures aid the evaporation on the outer surface of the heat exchanger block. The heat exchanger block also as a rule has a large surface area, as a result of which the evaporation is likewise aided.

It is also be preferred if the selectively permeable diaphragm is connected, such as, in particular, adhesively bonded, to the respective tube. As an alternative, however, the diaphragm can also be connected in some other way, such welded, etc. The adhesive bonding of the selectively permeable diaphragm to the tube is particularly advantageous, since the selectively permeable diaphragms are sensitive to high temperatures, as are produced, for example, during brazing, or welding. If the selectively permeable diaphragm is subjected to high temperatures, permanent damage of the selectively permeable diaphragm can occur, as a result of which the function of the selectively permeable diaphragm is disrupted. Furthermore, an adhesive bond is advantageous, since a fluid-tight connection between the tube and the selectively permeable diaphragm can be produced in a simple way as a result.

A selectively permeable diaphragm is distinguished, in particular, by the fact that it is permeable in one direction for certain fluids, whereas it is impermeable for other fluids. In particular, a selectively permeable diaphragm which is permeable for water is advantageous. In coolant coolers, the fluid which circulates in the heat exchanger as a rule has a water component which can penetrate to the outside through the selectively permeable diaphragm and can evaporate on the outer surface of the heat exchanger, as a result of which an additional cooling performance is produced with a constant installation space requirement.

Furthermore, it is to be preferred if the tubes are received on the end side in tube plates, and fin elements are arranged between the tubes, a cover being arranged on each of the tube plates, which cover forms a header box together with the respective tube plate, the tubes, the tube plates, the covers and the fin elements being adhesively bonded to one another.

On account of the temperature sensitivity of the selectively permeable diaphragm, it is particularly advantageous if all elements of the heat exchanger are connected to one another by way of the use of adhesives. Joining of the elements of the heat exchanger in a brazing furnace, as is the case in conventional heat exchangers, would lead to damage of the selectively permeable diaphragm. Suitable selectively permeable diaphragms, as known in the prior art, are suitable for temperatures up to approximately 120° C.

The heat exchanger is preferably constructed in a tube/fin design, the tubes being received on the end side in each case in tube plates. In alternative refinements, however, heat exchangers without tube plates can also be used, as long as the connection of the individual components which form the heat exchanger to one another is produced by way of adhesive bonding.

It is particularly advantageous if the selectively permeable diaphragm is applied to a supporting structure, the supporting structure and/or the selectively permeable diaphragm being connected, such as, in particular, adhesively bonded, to the tube.

In order to make the selectively permeable diaphragm insensitive to the pressures in the interior of the heat exchanger and, in particular, insensitive to the pressure fluctuations in the heat exchanger, the selectively permeable diaphragm can preferably be applied to a fluid-permeable supporting structure before it is adhesively bonded to the tube. A supporting structure can be formed, for example, by way of a grid-like element. Depending on the embodiment, the supporting structure and/or the selectively permeable diaphragm can be adhesively bonded directly to the tube.

Moreover, it is advantageous if the tube has at least one cutout, the edges of the cutout being formed by way of L-shaped receiving regions which are directed into the tube interior and into which the selectively permeable diaphragm and/or the supporting structure can be inserted.

The receiving regions are particularly advantageous, since they permit simple mounting of the selectively permeable diaphragm and/or the supporting structure on the tube. The L-shaped receiving regions which are directed into the tube interior make it possible for the inserted selectively permeable diaphragm to terminate flush with the outer surface of the tube, which is advantageous, in particular, with regard to an optimum flow around the tubes.

It is also advantageous if the selectively permeable diaphragm makes a transport of fluid out of the tube to the outside possible.

In order to achieve additional cooling performance as a result of the evaporation on the outer surface of the heat exchanger, transport or water from the inside to the outside is particularly advantageous. The selectively permeable diaphragm is preferably impermeable in the opposite direction, in order to avoid a contamination of the coolant in the heat exchanger.

It is also to be preferred if the tube has webs in the interior, the webs connecting two walls of the tube which lie opposite one another to one another.

The tube can be of more stable design as a result of additional webs between the inner surfaces of the tube. In particular, the pressure fluctuations of the coolant which are produced in the heat exchanger can be compensated for in an improved manner in this way.

Furthermore, it is particularly expedient if the webs are configured in one piece with the walls of the tube and/or are adhesively bonded to the inner walls of the tube. In order to avoid the use of brazing methods or welding methods, it is particularly advantageous if the webs are adhesively bonded to the inner walls.

Furthermore, it is expedient if the tube has, on two walls which lie opposite one another, in each case at least one cutout which is covered by way of a selectively permeable diaphragm.

Depending on the design of the tube, a plurality of outer surfaces can also have cutouts which are covered by a selectively permeable diaphragm. This is particularly advantageous, in order to produce as great a surface area as possible which permits a crossover of fluid to the outer surface of the heat exchanger. In this way, the additional cooling performance can be particularly great with a constant installation space requirement.

The problem with regard to the tube is solved by way of a tube having the features of claim 11.

One exemplary embodiment of the invention relates to a tube for a heat exchanger according to the invention, the tube having a wall section which is formed by way of a selectively permeable diaphragm.

A tube having a wall section which is formed by way of a selectively permeable diaphragm is particularly advantageous, in order to make the crossover of a fluid which flows through the tube to the outer surface possible. There, additional cooling performance can be produced by way of an evaporation of the fluid which has passed onto the outer surface. A tube of this type can preferably be used in heat exchangers of different design.

It is also expedient if the tube is produced by way or bending from strip stock. This is particularly advantageous, since, in addition to the outer surfaces of the tube, webs in the interior can also be formed in a simple way by way of the bending of the sheet metal strip which forms the strip stock for the tube. The L-shaped receiving regions can also be configured simply in this way, as a result of which an inexpensive rapid production of the tube is made possible overall.

Moreover, it is to be preferred if the tube is produced by way of an extrusion method. An extrusion method can be advantageous, in order for it to be possible to produce the tube profile in large quantities at high speed. Depending on the configuration of the die which is used, the tube profile can be adapted simply, and the webs which lie in the interior and the L-shaped receiving regions can also be produced in addition to the outer walls. The cutouts for the selectively permeable diaphragms can likewise already be produced during the extrusion method or can be made subsequently.

Advantageous developments of the present invention are described in the subclaims and in the following description of the figures.

BRIEF DESCRIPTION OF THE DRAWINGS

In the following text, the invention will be explained in detail using exemplary embodiments with reference to the drawings, in which:

FIG. 1 shows a cross section through a tube which is configured as a flat tube and has a cutout in one of the broad sides, which cutout is covered by way of a selectively permeable diaphragm, FIG. 2 shows a perspective view of a tube according to FIG. 1, FIG. 3 shows a cross section through a tube according to FIG. 1, webs additionally being configured in the interior of the tube, which webs connect the two broad sides which lie opposite one another to one another, FIG. 4 shows a cross section through a tube of alternative configuration, an additional web being formed in the interior of the tube by way of a folded-in region in the lower broad side, FIG. 5 shows a cross section through a further alternative embodiment of a tube, all webs in the interior of the tube being formed in each case by way of a folded-in region in the lower broad side, FIG. 6 shows a cross section through a tube which is produced by means of an extrusion method, the webs in the interior being configured in one piece with the tube, and FIG. 7 shows a cross section through an alternative embodiment of a tube, selectively permeable diaphragms being arranged on both broad sides and, in addition to the webs which connect the broad sides to one another, a web also being configured between the narrow sides of the tube.

PREFERRED EMBODIMENT OF THE INVENTION

FIG. 1 shows a cross section through a tube 1. The tube 1 has two narrow sides 2 which lie opposite one another and two broad sides 3 which lie opposite one another. The narrow sides 2 are rounded. The tube 1 is produced from a sheet metal strip by way of bending. To this end, the free end regions of the sheet metal strip are bent over, as a result of which the lower broad side 3 and the two narrow sides 2 are configured. The upper broad side is formed substantially by way of a diaphragm 4 which is inserted into a cutout 5.

The edges 6, 7 of the cutout 5 which lie on the left and the right are formed by way of the free end regions of the sheet metal strip which have been bent over in order to produce the tube. The edges 6, 7 in each case form an L-shaped receiving region 8 which protrudes into the tube interior. The diaphragm 4 is inserted into said L-shaped receiving regions 8 and is adhesively bonded to the tube 1. The selectively permeable diaphragm 4 can extend along the entire length of the tube 1 or else only over one or more part regions. The length of the tube 1 is measured in FIG. 1 along a surface perpendicular on the plane of the drawing.

The selectively permeable diaphragm 4 can additionally be applied to a supporting structure which increases the strength and stability of the selectively permeable diaphragm 4. The pressure resistance of the diaphragm 4, in particular, can be increased by way of the supporting structure which is not shown in figure in order to also ensure a sufficient pressure resistance of the tube 1 in the region of the diaphragm 4. The diaphragm 4 terminates flush with the outer surface of the tube 1.

FIG. 2 shows a perspective view of the tube 1, as has been shown in FIG. 1. FIG. 2 shows a part view of the tube 1. The selectively permeable diaphragm 4 forms the greatest part of the upwardly directed broad side 3 of the tube 1. In alternative embodiments, the selectively permeable diaphragm can also be of less broad configuration or can have a smaller length. The width of the tube 1 or of the diaphragm 4 is measured from one to the other narrow side 2, whereas the length is measured in a direction parallel to the narrow sides 2.

FIG. 3 shows a cross section through a tube 1, as has already been shown in FIGS. 1 and 2. In addition, the tube 1 has two webs 9 in the interior, which webs 9 run between the broad sides 3 or the lower broad side 3 and the selectively permeable diaphragm 4.

The webs 9 are formed in each case by way of the free end regions of the sheet metal strip which have been bent over in order to form the tube 1. The L-shaped receiving regions 8 are configured by way of bending by 90° downward out of the upper broad side 3 on each of the free end regions and subsequent bending by 90° to the left or to the right. The webs 9 are configured by way of renewed bending over of the free end regions by 90° downward. Finally, the webs 9 have a base region 10 which in turn is configured by way of bending over by 90° to the left or to the right and is seated on the inner side of the lower broad side 3.

The webs 9 are adhesively bonded fixedly with their respective base region 10 in each case on the inner side of the lower broad side 3. The tube 1 and the webs 9 are configured in one piece, all of the broad sides 3, the narrow sides 2, the L-shaped receiving regions 8 and the webs 9 with their base regions 10 being produced by way of bending operations of the free end regions of the sheet metal strip. The webs 9 increase the stability of the tube 1. In addition, the webs form a plurality of chambers 11 in the interior of the tube 1, which chambers 11 extend along the main throughflow direction of the tube 1.

In alternative embodiments, the webs can also be inserted subsequently into the shaped tube and can be adhesively bonded to the tube.

FIG. 4 shows a further alternative refinement of a tube 1, as has already been shown in the preceding FIGS. 1 to 3. In addition to the webs 9, a further web 12 is configured in FIG. 4. The web 12 is configured on the lower broad side 3 and is positioned centrally in the tube 1.

The web 12 is produced by way of bending of the sheet metal strip by 90° upward out of the plane of the lower broad side 3, subsequent bending of the sheet metal strip by 180° downward and final bending of the sheet metal strip by 90° back into the plane of the lower broad side 3. The web 12 is therefore also configured in one piece with the remaining tube 1 and is produced only by way of bending operations of the sheet metal strip which acts as strip stock for the tube 1. The web 12 is supported on the selectively permeable diaphragm 4 or on the supporting structure below the selectively permeable diaphragm 4. The web 12 is of double-walled configuration.

In the exemplary embodiment of FIG. 4, the tube 1 is divided into four chambers 13 which extend along the main throughflow direction of the tube 1.

FIG. 5 shows a further alternative embodiment of the tube 1. In contrast to the preceding embodiments of FIGS. 3 and 4, the tube 1 has three webs 14 which have been produced from the lower broad side 3 by means of material doubling operations as a result of bending operations in a manner which is analogous in each case to the web 12 from FIG. 4. The webs 14 are distributed over the width of the tube 1. All three webs 14 support the lower broad side 3 with respect to the diaphragm 4 or with respect to the supporting structure below the selectively permeable diaphragm 4.

The free end regions of the sheet metal strip in FIG. 5 are shaped into L-shaped receiving regions 8 in an analogous manner to FIG. 1. The two outer webs 14 adjoin the L-shaped receiving regions 8 directly with their upper end region. In alternative refinements, a different number of webs can also be provided. The webs can also be provided in a different arrangement within the tube.

The tube from FIG. 5 is divided into four chambers 15 by way of the webs 14. As was also the case in the preceding FIGS. 3 and 4, the webs 14 are adhesively bonded to the inner surfaces of the tube 1 or to the supporting structure or the selectively permeable diaphragm 4.

FIG. 6 shows a cross section through a tube 20. The tube 20 is produced by way of an extrusion method. The tube 20 has two narrow sides 21 which lie opposite one another and two broad sides 22 which lie opposite one another. A cutout 23 is arranged in the upper broad side 22, into which cutout 23 a selectively permeable diaphragm 24 is inserted. As was also the case in the preceding figures, the selectively permeable diaphragm 24 is applied on a supporting structure (not shown) which increases the stability of the selectively permeable diaphragm 24.

The cutout 23 is delimited laterally by way of L-shaped receiving regions into which the selectively permeable diaphragm 24 is inserted. The selectively permeable diaphragm 24 is adhesively bonded to the tube 20 in the region of the L-shaped receiving regions 25.

A plurality of webs 26 are arranged in the interior or the tube 20, which webs 26 are of T-shaped configuration and run from the lower broad side 22 toward the upper broad side 22 or the selectively permeable diaphragm 24. The section of the webs 26 which runs parallel to the broad sides 22 bears against the selectively permeable diaphragm 24 or against the L-shaped receiving regions 25. The webs 26 are adhesively bonded to the tube 20 at the contact points between the webs 26 and the selectively permeable diaphragm 24 or the upper broad side 22. Six chambers 27 which extend along the main throughflow direction are configured in the tube 20 by way of the webs 26.

The webs 26 are configured in one piece with the tube 20 and are already formed into the tube 20 during the extrusion method. In alternative embodiments, the number, the positioning and the shape of the webs can vary.

FIG. 7 shows a further tube 30 which is produced by way of an extrusion method. The tube 30 has two narrow sides which lie opposite one another and two broad sides 32 which lie opposite one another. In each case one cutout 33 which is covered in each case by way of a selectively permeable diaphragm 34 is arranged both in the upper broad side 32 and in the lower broad side 32. The edges of both cutouts 33 are configured by way of inwardly directed L-shaped receiving regions into which the selectively permeable diaphragm 34 can be inserted and can be adhesively bonded to the tube 30.

A plurality of webs 36, 37 are configured in the tube 30. The webs 36 run from the lower broad side 32 to the upper broad side, whereas the web 37 runs from the left-hand narrow side 31 to the right-hand narrow side 31. The transversely running web 37 divides the inner volume of the tube 30 into an upper half and a lower half. The webs 36 are configured in the form of I-beams and bear at the top and the bottom in each case against the selectively permeable diaphragms 34 or the supporting structure (not shown). The two outer webs 36 in each case directly adjoin the L-shaped receiving regions 35. The webs 36 intersect the transversely running web 37. The webs 36, 37 are configured in one piece together with the outer walls of the tube 30 and are produced in a common extrusion method.

The inner volume of the tube 30 is divided by way of the webs 36 and the web 37 into twelve chambers 38 which extend along the main throughflow direction of the tube 30.

In alternative embodiments, the tubes from FIGS. 1 to 6 can also have in each case a plurality of selectively permeable diaphragms. The selectively permeable diaphragms are preferably arranged in each case on the broad sides, in order for it to be possible to design the selectively permeable membranes with as great a surface area as possible. The larger the selectively permeable diaphragms are configured, the more water can pass through the selectively permeable diaphragms and can evaporate on the outer surface of the tubes, as a result of which additional cooling performance is produced.

It is possible, moreover, to configure the webs in the interior of the tubes by way of inserts which are inserted into the tubes along the main throughflow direction of the latter and are adhesively bonded to the inner sides of the tubes. Flat tubes can also be produced here completely by way of the bending of a sheet metal strip. It is advantageous here that, independently of their production method, the tubes have a cutout on one of the outer surfaces, which cutout can be covered by a selectively permeable diaphragm. The inner side of the selectively permeable diaphragm comes into contact directly with the fluid which flows through the tubes, in order to make a crossover of the fluid or of the water component of the fluid possible.

The exemplary embodiments which are shown in FIGS. 1 to 7 do not have any restrictive character, in particular with regard to the design of the tubes and the design and arrangement of the webs.

The invention claimed is:

1. A heat exchanger having
a plurality of tubes configured to be flowed through by a fluid, wherein each tube of the plurality of tubes opens on a first end into a first header box and opens on a second end into a second header box such that the first and second header boxes are in fluid communication with one another by way of the tube, wherein at least one of the tubes of the plurality of tubes has at least one wall section which is configured by way of a selectively permeable diaphragm, wherein the selectively permeable diaphragm is not permeable in one direction to at least one fluid.

2. The heat exchanger as claimed in claim 1,
wherein each tube has at least one wall section which is configured by way of the selectively permeable diaphragm.

3. The heat exchanger as claimed in claim 1,
wherein the selectively permeable diaphragm is connected to the respective tube.

4. The heat exchanger as claimed in claim 1, wherein the heat exchanger further comprises tube plates, wherein the plurality of tubes are received on the first or second ends in openings of the tube plates, wherein fin elements are arranged between the plurality of tubes, wherein a cover is arranged on each of the tube plates, which cover forms the first or second header box together with the respective tube plate, wherein the tube, the tube plates, the covers, and the fin elements are adhesively bonded or brazed to one another.

5. The heat exchanger as claimed in claim 1,
wherein the selectively permeable diaphragm is applied to a supporting structure, wherein the supporting structure or the selectively permeable diaphragm is adhesively bonded to the tube.

6. The heat exchanger as claimed in claim 1,
wherein at least one tube of the plurality of tubes has at least one cutout, wherein edges of the cutout are formed by way of L-shaped receiving regions which are directed into an interior of the at least one tube and into which the selectively permeable diaphragm or the supporting structure can be inserted.

7. The heat exchanger as claimed in claim 1,
wherein the selectively permeable diaphragm is permeable in a first direction to the at least one fluid and impermeable in a second direction to the at least one fluid and makes a transport of the at least one fluid out of the tube to the outside possible.

8. The heat exchanger as claimed in one claim 1,
wherein at least one tube of the plurality of tubes has webs in a tube interior, the webs connecting two walls of the at least one tube which lie opposite one another to one another.

9. The heat exchanger as claimed in claim 8,
wherein the webs are configured in one piece with the walls of the tube or are adhesively bonded to the inner walls of the tube.

10. The heat exchanger as claimed in claim 1,
wherein at least one tube of the plurality of tubes has, on two walls which lie opposite one another, in each case at least one cutout which is covered by way of a selectively permeable diaphragm.

11. A tube for a heat exchanger as claimed in claim 1,
wherein the tube has at least one wall section which is configured by way of the selectively permeable diaphragm.

12. The tube as claimed in claim 11,
wherein the tube is produced by way of bending from strip stock.

13. The heat exchanger as claimed in claim 11,
wherein the tube is produced by way of an extrusion method.

14. The heat exchanger as claimed in claim 3,
wherein the selectively permeable diaphragm is adhesively bonded to the respective tube.

15. A heat exchanger having
a plurality of tubes configured to be flowed through by a fluid, wherein each tube of the plurality of tubes opens on a first end into a first header box and opens on a second end into a second header box such that the first and second header boxes are in fluid communication with one another by way of the tube, wherein at least one of the tubes of the plurality of tubes has at least one wall section which is configured by way of a selectively permeable diaphragm,
wherein at least one tube of the plurality of tubes has at least one cutout, wherein edges of the cutout are formed by way of L-shaped receiving regions which are directed into an interior of the at least one tube and into which the selectively permeable diaphragm or the supporting structure can be inserted.

16. A heat exchanger having
a plurality of tubes configured to be flowed through by a fluid, wherein each tube of the plurality of tubes opens on a first end into a first header box and opens on a second end into a second header box such that the first and second header boxes are in fluid communication with one another by way of the tube, wherein at least one of the tubes of the plurality of tubes has at least one wall section which is configured by way of a selectively permeable diaphragm,
wherein at least one tube of the plurality of tubes has webs in a tube interior, the webs connecting two walls of the at least one tube which lie opposite one another to one another.

* * * * *